Sept. 1, 1959 W. R. HORST 2,901,905
PORTABLE STRAIN GAUGE CALIBRATOR
Filed Oct. 6, 1955 2 Sheets-Sheet 1

INVENTOR
WILLIAM R. HORST

BY Toulmin & Toulmin

ATTORNEYS

Sept. 1, 1959   W. R. HORST   2,901,905
PORTABLE STRAIN GAUGE CALIBRATOR
Filed Oct. 6, 1955   2 Sheets-Sheet 2

INVENTOR
WILLIAM R. HORST
BY
ATTORNEYS

United States Patent Office 2,901,905
Patented Sept. 1, 1959

2,901,905
PORTABLE STRAIN GAUGE CALIBRATOR

William R. Horst, Dayton, Ohio, assignor to The Commonwealth Engineering Company of Ohio, a corporation of Ohio Application October 6, 1955, Serial No. 538,843

4 Claims. (Cl. 73—1)

The present invention relates to a calibrator apparatus, more particularly, to an improved and simplified arrangement of components in a portable apparatus for generating strains of predetermined frequencies and amplitudes in resistance type strain gauges.

The use of resistance type strain gauges to measure stresses and loads produced in various types of structures has been a common expedient in industry for many years. In operation, the gauge is suitably adhered to the structure in which the strain is to be measured. Variations in strain of the stressed portion of the structure are transmitted to the gauge. The physical deformation of the gauges produced by these strains result in varying the electrical resistance of the gauge. These changes in electrical resistance are proportional to the strains produced in the gauges. Consequently, by measuring the electrical resistance of a strain gauge by a suitable calibrated apparatus, an indication will be obtained of the stress in the structure at that particular time.

Amplifiers are conventionally employed in conjunction with resistance type strain gauges to translate the variations of electrical resistance into readings of stress. Consequently, the amplifier must be properly calibrated in order to obtain accurate determinations of loads and stresses.

In the process of calibrating the amplifying equipment, it is desirable that strains be generated of selected and known frequencies and amplitudes. The resulting corresponding readings on the amplifier when calibrated with the known strains will enable the amplifier to accurately determine the stresses in the structure as indicated by the strains recorded in the strain gauges.

While elaborate and complicated but highly accurate pieces of strain generating equipment have been employed in the past, it is frequently desirable that the strain generating equipment be portable rather than be permanently installed. To sufficiently reduce the weight of the apparatus, it is necessary to compactly arrange the components thereof in order to occupy a minimum of space and have a total weight which would permit the average individual to comfortably carry the apparatus for a reasonable period of time. In order to devise a satisfactory portable strain generating apparatus, various features have been proposed which have been incorporated in the apparatus disclosed as this invention. The combining of these features results in an apparatus for generating strains which is especially adapted to be portable.

The present invention provides an apparatus for generating strains in resistance type strain gauges which essentially comprises a cantilever beam which is of equal stress throughout when subjected to a concentrated load at the free end thereof. This beam is mounted upon a vertical member which also supports a terminal board beneath the cantilever beam. The terminal board provides electrical connections between strain gauges mounted upon the cantilever beam and the amplifier which is being calibrated.

A concentrated load is produced upon the free end of the cantilever beam by connecting an adjustable connecting rod between said free end and an eccentric mounted upon a shaft driven by an electric motor. The speed of the electric motor is regulated by a control box. The vertical member, the electric motor and the control box are compactly arranged upon a base which is enclosed by a cover readily removable from the apparatus. A hand grip upon the cover provides means for carrying the complete apparatus.

It is therefore the principal object of this invention to provide an improved portable apparatus for generating predetermined strains in strain gauges.

It is another object of this invention to provide a novel and compact arrangement of the components of an apparatus for generating strains in strain gauges.

It is a further object of this invention to provide an apparatus for generating strains in strain gauges which has a simplified enclosure structure.

It is an additional object of this invention to provide a portable apparatus for generating strains in strain gauges wherein the enclosure and handle are combined.

It is still another object of this invention to provide an arrangement of a terminal board in an apparatus for generating strains in strain gauges which occupies a minimum of space.

It is a still further object of this invention to provide an apparatus for generating strains in strain gauges which requires a minimum of wiring to electrically connect several components thereof.

Other objects and advantages of this invention will become readily apparent upon reference to the following description when taken in conjunction with the accompanying drawings wherein.

Figure 1:
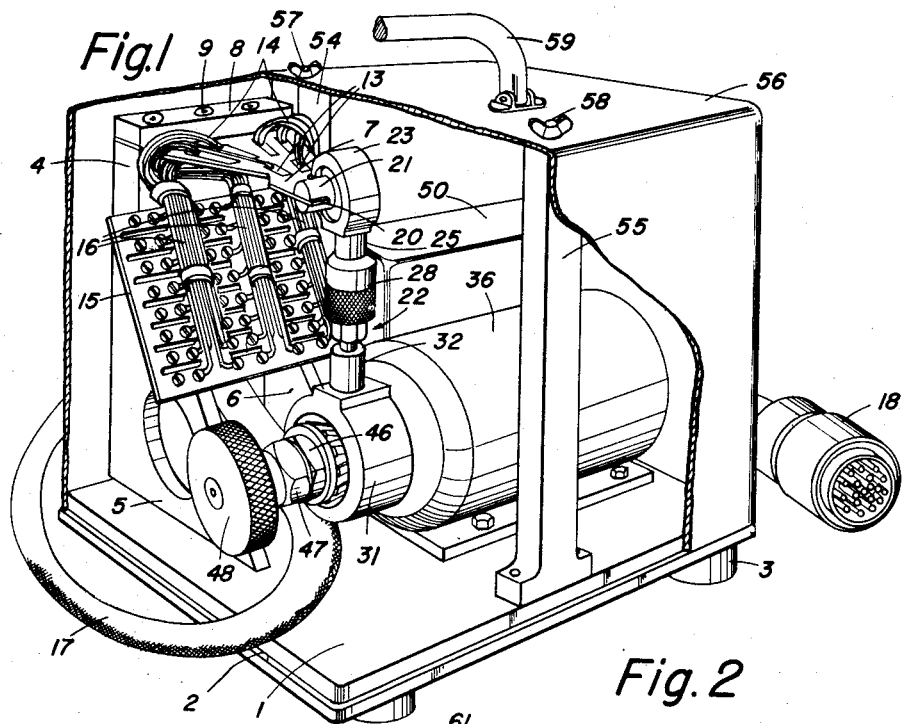
Fig. 1 is an over-all perspective view of the apparatus of this invention with a portion of the enclosure structure removed to show the components thereof.

Returning now to the drawings, more particularly to Fig. 1 wherein like reference symbols indicate the same parts throughout the various views, 1 indicates the supporting base or chassis of the strain generating apparatus. The base 1 is square and has a shoulder 2 extending about the edge thereof. The base is supported upon resilient mounts 3 secured to each corner of the bottom face of the base.

On the upper face of the base 1 is mounted a vertical supporting member 4 which is reinforced by triangular bracing members 5 and 6.

A triangular cantilever beam 7 has its base end rigidly secured to the top surface of the vertical supporting member 4 by means of a clamping bar 8 and bolts 9. The cantilever beam 7 is designed so that it has an equal stress throughout when subjected to a concentrated load at the free end thereof. There are numerous shapes of the beam which would result in this characteristic. The cantilever beam 7 disclosed in this invention has a triangular breadth, constant depth shape, and comprises lateral sides 10 and 11 which, when extended, will intersect at the point 12 which is the location of the free end of the beam. The concentrated load is applied at the point 12 to flex the beam in a manner to be presently described.

A plurality of resistance type strain gauges indicated at 13 are suitably fastened to the top surface of the cantilever beam 7. Electrical leads 14 connect the strain gauges 13 to the proper terminals on a terminal board 15 which is mounted upon the sloping edges of triangular braces 5 and 6 in a manner as illustrated in Fig. 1. The terminals are subsequently connected to leads 16 which are combined into a cable 17 having a multi-terminal plug 18 on the end thereof. The plug 18 enables the apparatus to be connected with the amplifier.

Figure 2:
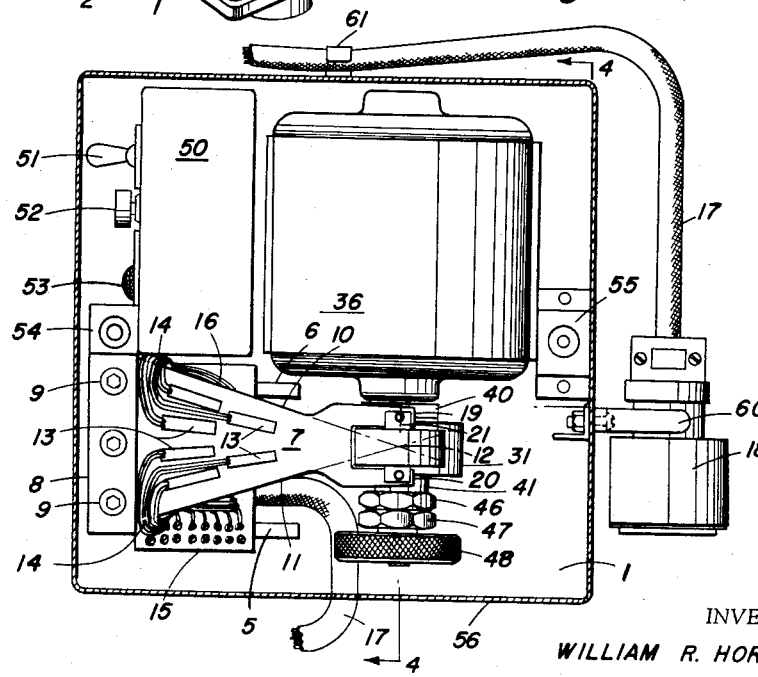
Fig. 2 is a top plan view of the apparatus with the top of the cover removed.

Returning now to the cantilever beam 7, it may be seen that the free end of the beam comprises bifurcations 19 and 20, as illustrated in Fig. 2. A shaft 21 extends between the bifurcations 19 and 20 and has the longitudinal axis thereof intersecting the free end 12. The upper end of a connecting rod indicated generally at 22 is connected to the shaft 21.

The connecting rod 22 comprises an upper eye 23 which houses a sealed upper ball-bearing 24 journalled upon the shaft 21. The shank of the eye indicated at 25 has a threaded axial bore 26.

Received within the threaded bore 26 is the upper end of a turn-buckle stud 27, which has a knurled thimble 28 secured thereto by means of a rivet 29.

The lower end of the stud 27 is threaded at 30 and is connected to a lower eye 31. The lower eye 31 similarly comprises a shank 32 having a threaded axial bore 33 therein which receives the stud 27. A sealed lower ball-bearing 34 is received within the eye 31.

The lower ball-bearing 34 is mounted by means of an eccentric arrangement which is presently to be described upon a shaft 35 which is driven by an electric motor 36 mounted upon the base 1. The axis of the motor 36 is at right angles to the longitudinal axis of the beam 7.

The eccentric arrangement comprises an outer eccentric 37 having an axial bore 38 therein which receives the shaft 35. The outer eccentric 37 has threads 39 at the outer end thereof and an external flange 40 at the other end thereof which is normally positioned adjacent the motor 36. A dowel 41 secures the outer eccentric 37 to the shaft 35. A lock washer 42 is positioned upon the outer eccentric 37 adjacent the flange 40.

An inner eccentric 43 is fitted upon the outer eccentric 37 with one end thereof being in contact with the lock washer 42. There is an external flange 44 upon the other end of the inner eccentric. The length of the inner eccentric between the external flange 44 and the other end thereof is of sufficient width to accommodate the inner ball-bearing 34.

Figure 4:
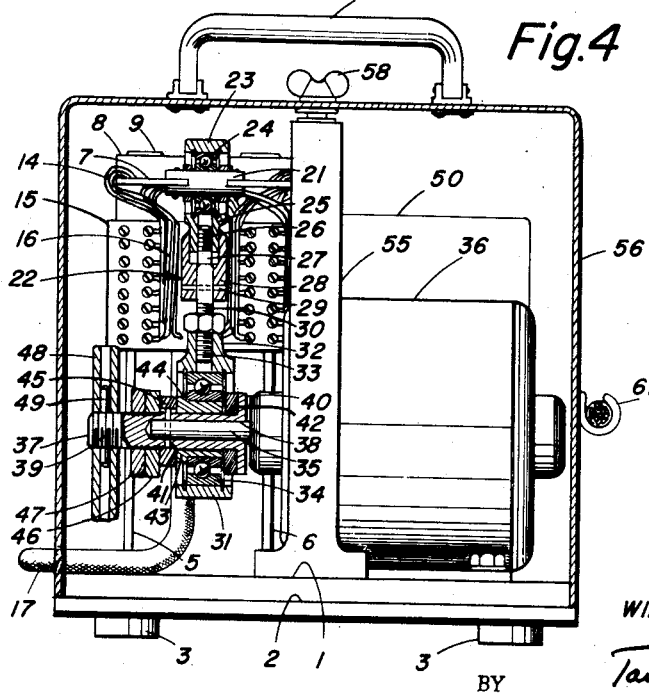
Fig. 4 is a sectional view taken along the lines 4—4 of Fig. 2 illustrating the details of the connecting rod structure.

A collar 45 is positioned upon the outer eccentric 37 adjacent the flange 44 of the inner eccentric. As may be seen in Fig. 4 the collar 45 has an axial internal slot therein to receive an end of the dowel 41.

The entire eccentric assembly is held in position by means of a locking nut 46 which is threaded upon the external threads 39 of the outer eccentric. The locking nut 46 is threaded up against the collar 45 to urge the flange 44 of the inner eccentric and the lock washer 42 into engagement with the ball-bearing 34.

A jam nut 47 is then threaded upon the threads 39 of the outer eccentric into contact with the locking nut 46 to secure the locking nut in position.

A fly wheel 48 having a knurled periphery is threaded upon the outer eccentric 37 and secured in position by means of a dowel 49. Fly-wheel 48 also serves as a knob by which the shaft 35 may be rotated without operating the electric motor 36.

The electric motor 36 is regulated by means of a control box 50, which is also mounted upon the base 1 adjacent the motor 36 on the side thereof toward the vertical upright 4. Control box 50 comprises an on-and-off switch 51, a rheostat 52 to regulate the speed of the motor and a colored jewel light 53 to indicate when the electric motor approaches its upper speed limits.

A pair of vertical cover support posts 54 and 55 are secured to the upper face of the base 1 and are secured adjacent oposing edges of the base at approximately the mid-points thereof. As may be seen more clearly in Fig. 2, the post 54 is adjacent the vertical upright 4.

Consequently, the vertical post 55 is placed opposite the post 54 adjacent the side of the motor 36 away from the control box 50.

The entire apparatus is enclosed by a cover 56 which rests upon the top of the cover support posts 54 and 55 and the bottom edge is positioned on the shoulder 2 which extends about the base 1. Wing screws 57 and 58 extend downwardly through apertures in the top face of the cover 56 to threadedly engage bores in the support posts 54 and 55 respectively to secure the cover 56 in position upon the cover support posts.

A conventional hand grip 59 is mounted on the top surface of the cover 56.

Figure 3:
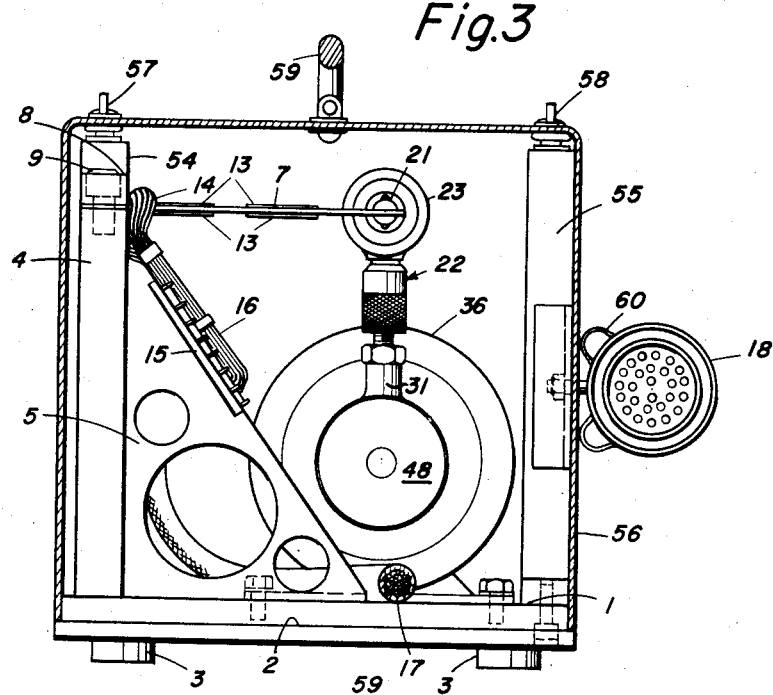
Fig. 3 is a side elevational view of the apparatus with a portion of the cover removed.

A spring clip 60 is secured to the side face of the cover 56 adjacent the cover support post 55. The clip 60 is of a size sufficient to accommodate the plug 18 to support the plug in the manner illustrated in Figs. 2 and 3.

A second clip 61 is provided on the side wall of the cover 56 adjacent the rear end of the motor 36. This clip is of a suitable size to receive the cable 17 and support the same as illustrated in Fig. 2.

To operate the apparatus of this invention, a determination is first made of the amplitude and frequency of flexing of the cantilever beam 7 which is to be imparted to the strain gauges 13 secured on the faces of the beam. The amplitude of the flexing of the beam 7 is determined by the throw of the inner and outer eccentrics. By rotating the inner and outer eccentrics with respect to themselves upon the shaft 35, it is possible to vary the amplitude of flexing over a range from zero throw to twice the maximum throw of an eccentric. When the eccentrics have been properly positioned relative to themselves, the locking and jam nuts 46 and 47 respectively are then tightened against the collar 45 to retain the eccentrics in this position. The frequency of the flexing of the cantilever beam 7 is determined by the speed at which the motor 36 is operated. The rotation of the shaft 35 will result in the connecting rod 22 imparting a concentrated load at the free end 12 of the beam 7.

Adjusting of the thimble 28 of the connecting rod 22 may be used to impart a preload stress in the beam 7 prior to the cyclic stresses imparted thereon due to the eccentric assembly. The connecting rod 22 is, in effect, a turn buckle adjustable by rotation of the thimble 28.

It is pointed out that the connecting rod is connected directly to the shaft 35. This arrangement eliminates the variable speed transmission which adds considerably to the weight of the entire apparatus. However, by providing a rheostat control by which the speed of the motor 36 may be varied, the variable speed transmission is unnecessary.

Thus it may be seen that the above disclosed invention represents a compact arrangement of components constituting an apparatus for generating predetermined strains in strain gauges. Furthermore, the entire apparatus is enclosed by a cover structure which also serves as a means to carry the apparatus. While the over-all simplicity of this apparatus is apparent, the essential components are available to enable the strain gauges and amplifiers to be calibrated over a wide range of stresses established by variations in amplitude and frequency of the flexing of the cantilever beam. The positioning of the terminal board beneath the cantilever beam provides for a minimum of wiring to connect the strain gauges with the terminal board. This arrangement permits the terminal board to occupy space which does not interfere in any way with the over-all operation of the apparatus.

It will be understood that this invention is susceptible to modification in order to adapt it to different usages and conditions, and, accordingly, it is desired to comprehend such modifications within this invention as may fall within the scope of the appended claims.

What is claimed is:

1. In a portable apparatus for generating predetermined strains in strain gauges, a base, a vertical support member upstanding near one edge of said base, a cantilever beam secured on the top of said vertical support member and extending inwardly over said base, a shaft mounted on the free end of said cantilever beam, said beam being so shaped as to be stressed equally along its length upon application of a concentrated load to the shaft on the free end thereof, an electric motor on said base, a motor shaft extending from said motor and passing under the said shaft on the free end of said beam, means eccentrically connecting at right angles said motor shaft and the said shaft on the free end of said beam to apply cyclically a concentrated load thereto, all portions of said elements positioned on said base being confined within the edges of said base, a cover having a handle and fitting upon said base and completely enclosing all of the elements on said base when in position on said base, and means for securing said cover to said base so that the entire apparatus can be lifted by said cover.

2. In a portable apparatus for generating predetermined strains in strain gauges, a base, a vertical support member upstanding near one edge of said base, a cantilever beam secured on the top of said vertical support member and extending inwardly over said base, a shaft mounted on the free end of said cantilever beam, said beam being so shaped as to be stressed equally along its length upon application of a concentrated load to the shaft on the free end thereof, an electric motor on said base, a motor shaft extending from said motor and passing under the said shaft on the free end of said beam, means eccentrically connecting at right angles said motor shaft and the said shaft on the free end of said beam to apply cyclically a concentrated load thereto, all portions of said elements positioned on said base being confined within the edges of said base, a pair of upstanding vertical members secured to the upper surface of said base, said vertical members being of equal height and being adjacent opposing edges of said base, a cover having a handle thereon and fitting upon said base to completely enclose all of the elements on said base when positioned thereon, said cover being supported upon said vertical members and said base when in position, and means for securing said cover to the tops of said vertical members.

3. In a portable apparatus for generating predetermined strains in strain gauges, a substantially square base, a vertical support member upstanding adjacent one edge of said base, a cantilever beam secured on the top of said vertical support member and extending inwardly over said base, a shaft mounted on the free end of said cantilever beam, said beam being so shaped as to be stressed uniformly along its length upon application of a concentrated load to the shaft on the free end thereof, an electric motor on said base, a power output shaft extending from said motor with the axis of said output shaft passing directly beneath the said shaft on the free end of said cantilever beam, means eccentrically connecting at right angles said output shaft and the said shaft on the free end of said cantilever beam to apply cyclically a concentrated load thereto, and a motor controller device on said base between the edge of the base and parallel to said vertical support member and said motor, all portions of said elements mounted upon said base being confined within the edges of said base.

4. In a portable apparatus for generating predetermined strains in strain gauges, a base, a vertical support member upstanding near one edge of said base, a cantilever beam secured on the top of said vertical support member and extending inwardly over said base, a shaft mounted on the free end of said cantilever beam, said beam being so shaped as to be stressed equally along its length upon application of a concentrated load to the shaft on the free end thereof, support members between said vertical support member and said base for bracing said vertical support member upon said base, said support members being positioned directly underneath said cantilever beam, a terminal board mounted on said support members beneath said cantilever beam, there being a plurality of strain gauges on said cantilever beam, means electrically connecting said strain gauges to select the terminals on said terminal board, an electric motor on said base, a motor shaft extending from said motor and passing under the said shaft on the free end of said beam, means eccentrically connecting at right angles said motor shaft and the said shaft on the free end of said beam to apply cyclically a concentrated load thereto, all portions of said elements positioned on said base being confined within the edges of said base, a cover having a handle and fitting upon said base and completely enclosing all of the elements on said base when in position on said base, and means for securing said cover to said base so that the entire apparatus can be lifted by said cover.

References Cited in the file of this patent
UNITED STATES PATENTS

| | | |
|---|---|---|
| 2,252,464 | Kearns et al. | Aug. 12, 1941 |
| 2,357,643 | Floyd | Sept. 5, 1944 |
| 2,505,601 | Bender et al. | April 25, 1950 |
| 2,514,368 | Bradford | July 11, 1950 |
| 2,591,444 | Lazan | April 1, 1952 |
| 2,598,812 | Marco et al. | June 3, 1952 |
| 2,688,873 | Burris-Meyer | Sept. 14, 1954 |
| 2,789,427 | Brier | April 23, 1957 |

OTHER REFERENCES

Publication: "Baldwin SR4 Calibration Kit" Baldwin Lima Corporation, Philadelphia, Pa. Bulletin 430B (1954) page 5.